Dec. 7, 1943.           C. F. KAUNITZ           2,336,403
                        WELDING APPLIANCE
              Filed May 1, 1942         4 Sheets-Sheet 1
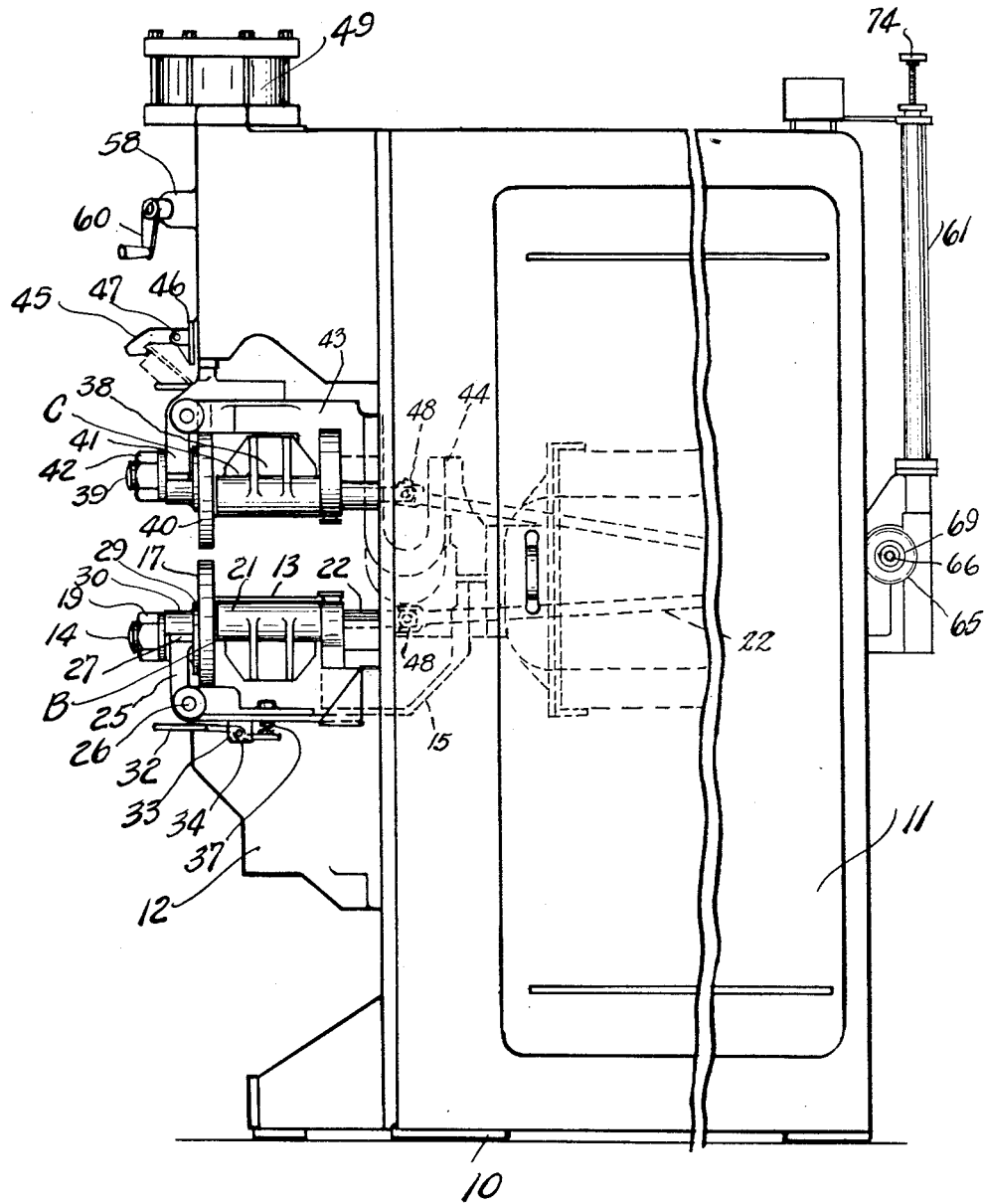

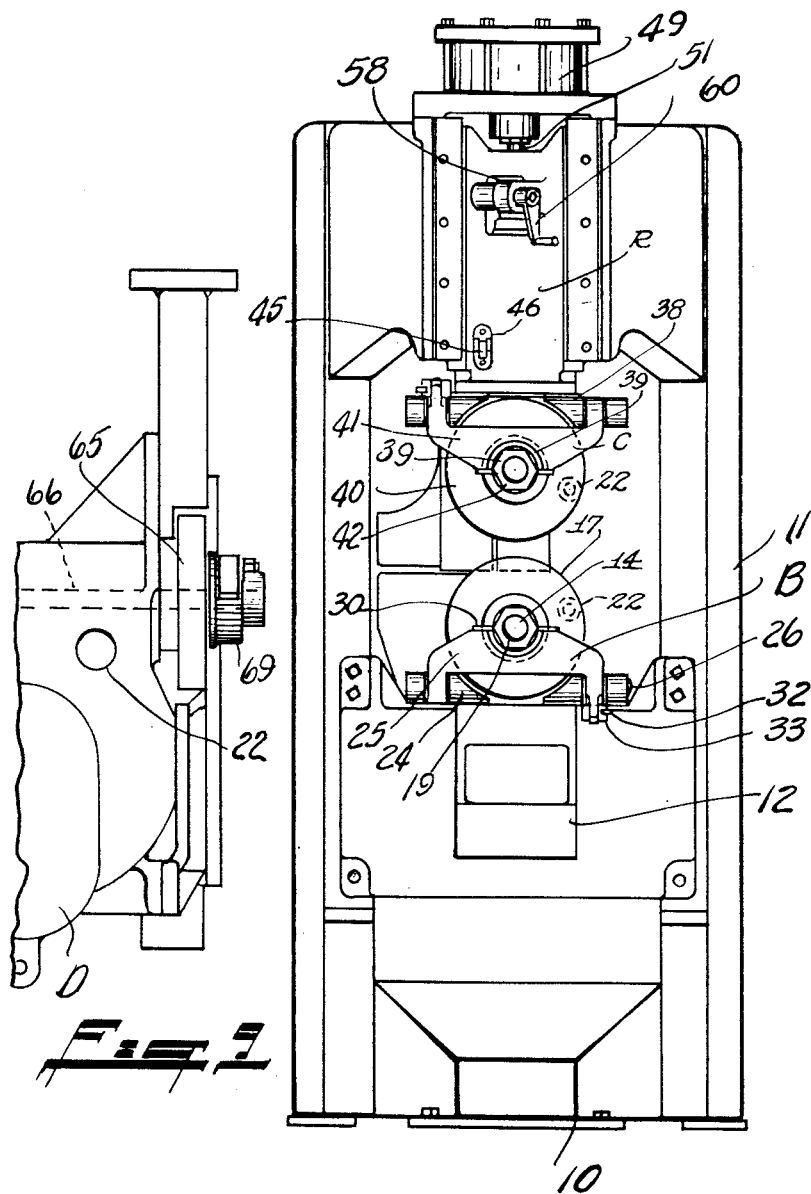

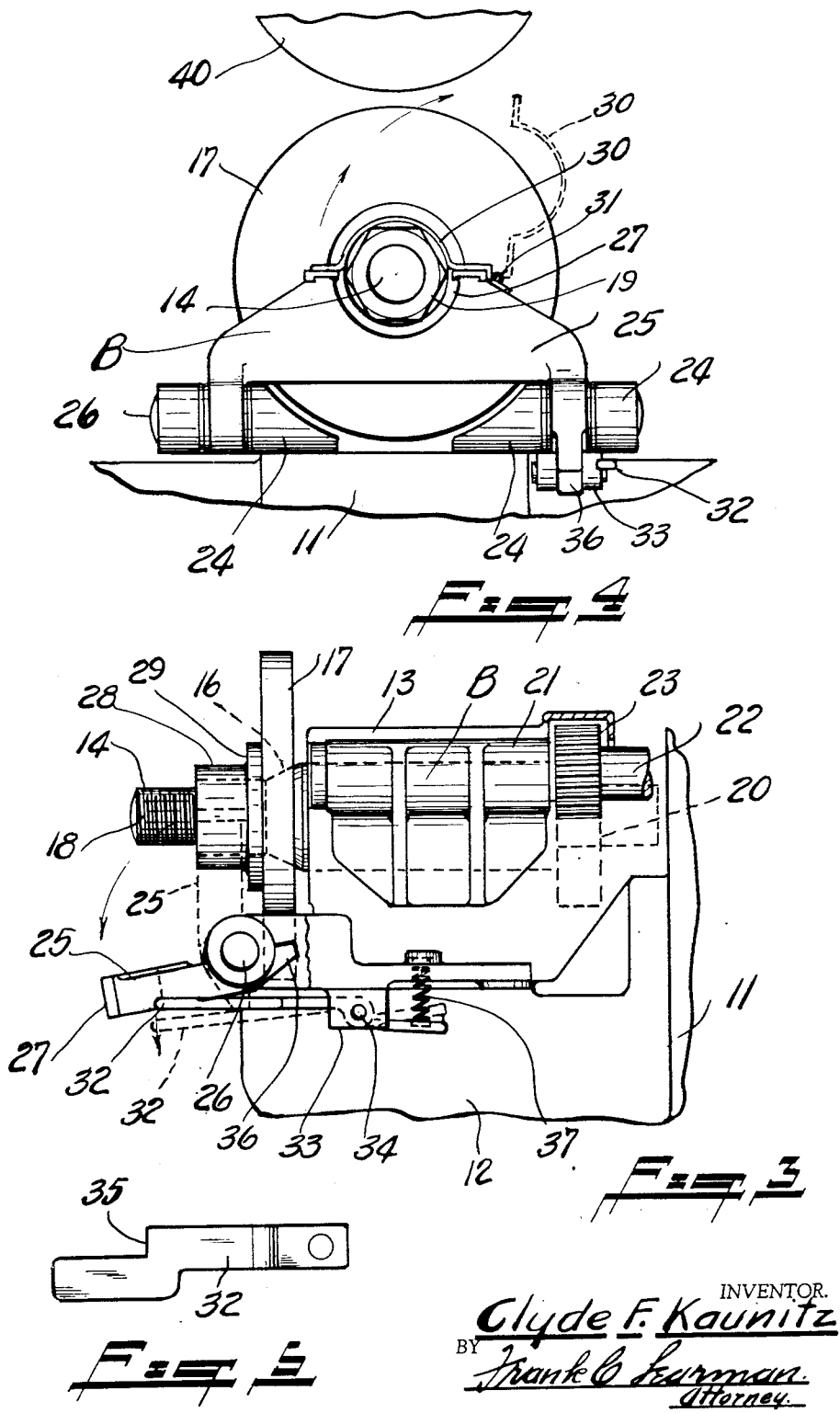

Dec. 7, 1943. C. F. KAUNITZ 2,336,403
WELDING APPLIANCE
Filed May 1, 1942 4 Sheets-Sheet 4
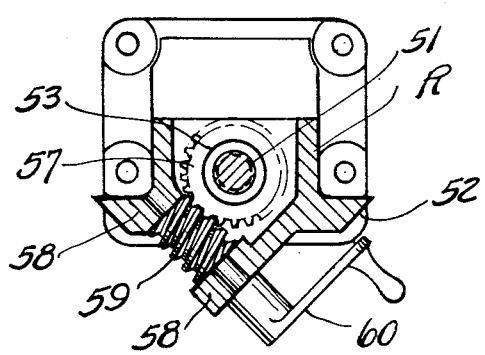
Fig. 7
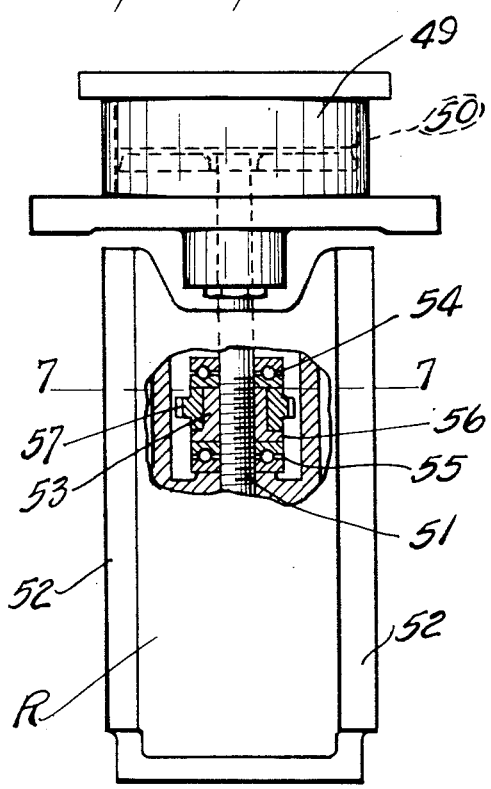
Fig. 6
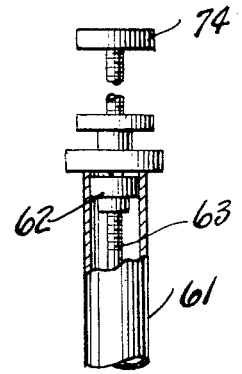
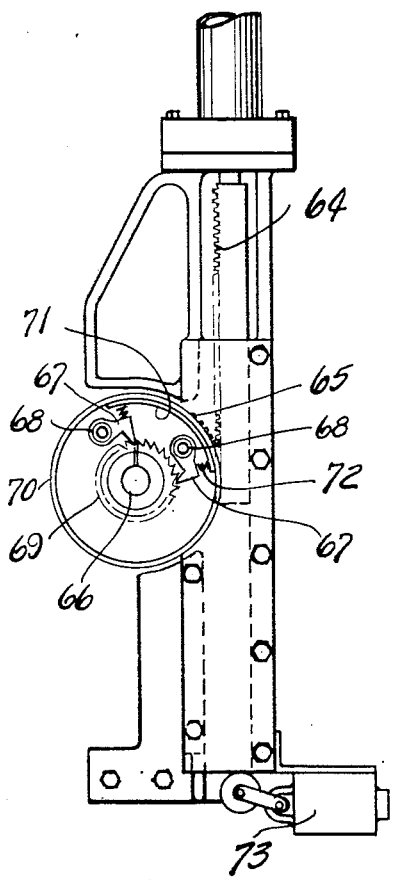
Fig. 8
INVENTOR.
Clyde F. Kaunitz.
BY Frank C. Fearman.
Attorney.

Patented Dec. 7, 1943

2,336,403

UNITED STATES PATENT OFFICE 2,336,403

WELDING APPLIANCE

Clyde F. Kaunitz, Bay City, Mich., assignor to National Electric Welding Machines Co., Bay City, Mich.

Application May 1, 1942, Serial No. 441,384

8 Claims. (Cl. 219—4)

This invention relates to an improved welding appliance such as a heavy duty seam welder for welding heavy material, propeller blades, and similar equipment.

Another important object of the invention is to design a rigid machine frame in which the vertically aligned welding wheels are located directly under the pressure ram, thus insuring that the wheel faces will run true to one another.

Another object is to design a machine provided with welding wheel bearings including an outboard support which eliminates all deflection, insuring accuracy and true alignment, and materially increasing the useful life of the bearings.

Another object is to design a machine having limited throat depth, but sufficient to accommodate the part to be welded, thus providing for rigid frame construction and minimizing the extent of overhang from the frame.

A still further object is to provide simple, practical, and convenient means for accurately adjusting the welding wheels with relation to each other as the wheel diameter is changed by reason of wear, change in thickness of stock, or for any other reason.

With the above and other objects in view the present invention consists in the combination and arrangement of parts, hereinafter more fully described, illustrated in the accompanying drawings, and more particularly pointed out in the appended claims, it being understood that changes may be made in the form, size, proportions and minor details of construction, without departing from the spirit, or sacrificing any of the advantages of the invention.

In the drawings:

Fig. 1 is a side elevational view of the welding machine, the broken lines showing the upper outboard support swung outwardly to permit removal of the upper welding wheel;

Fig. 2 is a front elevational view of the mechanism;

Fig. 3 is an enlarged fragmentary side elevational view of the welding wheels with the lower outboard support swung down to permit removal of the lower welding wheel;

Fig. 4 is an enlarged fragmentary front view thereof, the broken lines showing the dust band swung up;

Fig. 5 is a detail plan view of the locking lever;

Fig. 6 is an enlarged fragmentary front elevational view of the ram and hydraulic cylinder, the face being broken away to show the adjusting means.

Fig. 7 is a sectional plan view taken on the line 7—7 of Fig. 6.

Fig. 8 is an enlarged face view of the step roll drive mechanism.

Fig. 9 is a fragmentary edge view of the assembly shown in Fig. 8.

In the welding of heavy material, especially high carbon steel alloy, the welding wheels are subjected to severe usage, and to insure against faulty and imperfect welding, it is necessary to frequently re-machine the faces of the welding wheels. It is therefore essential that the changing, removal, or replacement of the wheels be completed in a minimum length of time, to eliminate expensive delay and lost time, and this I have accomplished in the instant construction which combines rigidity, as well as precision, and speed.

Referring now to the drawings in which I have shown one embodiment of my invention, the numeral 10 indicates a base provided with a case or housing 11 as usual. A knee bracket 12 is bolted or otherwise secured to the front wall of the housing and a lower welding wheel assembly B is mounted thereon, said assembly including a bearing 13 in which the horizontally disposed shaft 14 is journaled, the inner end of this bearing structure being connected to a heavy flexible conductor 15 whereby welding current is conducted.

The bearing member 13 is preferably water cooled, and the forward end section of the shaft 14 is tapered as at 16 to accommodate the lower welding wheel 17, the end of the shaft being reduced and threaded as at 18 to accommodate the nut 19, and a pinion gear 20 is also mounted on the opposite end of said shaft.

A horizontally disposed drive shaft bearing 21 is mounted on the side of the bearing 13 and a drive shaft 22 is journaled therein, a spur gear 23 being provided on said shaft, said gear meshing with and driving the pinion gear 20 provided on the shaft 13 for imparting motion to the welding wheel.

Spaced apart pairs of outwardly projecting lugs 24 are provided on the bearing assembly B and an outboard support 25 is hingedly secured thereto by means of hinge pins 26, the upper end of the outboard support being shaped to form a bearing 27 in which the turned section 28 of the collar 29 is journaled, and a band cap 30 is hingedly connected to the bearing portion of the support at the joint 31 for excluding dust, dirt, and other foreign matter, and it will be obvious that this construction permits the cap 30 to be readily swung back and out of engagement with the shaft as clearly shown in Fig. 4 of the drawings.

Suitable locking means is provided for securing the outboard supports in position and comprises a locking lever 32 pivotally mounted on the depending lug 33 at the point 34, said lever being notched as at 35 to accommodate the depending lug 36 which is cast integral with the support, a spring 37 being interposed between the inner end of the locking lever and the bearing support to hold it in locked position; and it will be obvious that when the lever 32 is pressed down to the position shown in broken lines in Fig. 3 of the drawings, that the outboard support can be swung down to the position shown in solid lines in this same figure, and then upon removal of the nut 19, the welding wheel 17 can be readily removed.

The upper wheel assembly C is identically similar to the lower wheel assembly and comprises the bearing 38 and shaft 39, on which the upper welding wheel 40 is mounted. An outboard support 41 is also provided as shown and these parts are held in position by the nut 42; and I do not deem it necessary to describe these parts in detail excepting to state that the assembly is carried on the bracket 43 which is connected to the ram R and also to the flexible conductor 44 which is similar to the lower assembly. Suitable latching means is provided for holding the outboard support 41 in raised position, this means comprising a dog 45 pivotally secured to the bracket 46 by means of a pin 47, said bracket being mounted on the ram R as shown.

The welding wheels 17 and 40 are driven from a conventional worm gear reduction unit D, which is mounted in the housing 11. This reduction unit is completely enclosed, runs in oil, and the shafts 22 extend forwardly from said unit with a universal joint 48 interposed intermediate the length of each shaft to compensate for wheel wear and adjustment, etc., of the wheel assembly, the spur gears 23 meshing with and driving the pinion gears 20 for imparting motion to the welding wheels.

These welding wheels 17 and 40, due to the nature of the work, rapidly become uneven, and consequently must be removed and dressed from time to time, or replaced with new wheels when the old wheels are too small for further use. For example, a welding roll eleven (11) inches in diameter can be worn and re-dressed to approximately a seven (7) inch O. D. after which it must be replaced, and this can be easily and quickly accomplished. It is merely necessary to release the hand lock levers 32, swing the outboard bearings outwardly, and engage the dog 45 to hold the upper support in raised position, after which the nuts 19 and 42 are backed off so that the worn wheels can be quickly removed and replaced or new wheels placed in position.

A ram operating cylinder 49 is provided on the upper end of the main frame and is connected to a suitable source of air supply (not shown), a piston 50 being reciprocatingly mounted in the cylinder and a threaded rod 51 being connected thereto and adjustably connected to the ram R, which is slidably mounted on guides 52 provided on the face of the head.

An internally threaded nut 53 is mounted in the ram R and has threaded engagement with the rod 51, bearings 54 and 55 respectively being provided on opposite sides of said nut which is also formed with a flange 56 as shown. A worm wheel 57 is mounted on the nut 53, seating against the flange 56 and being non-rotatable with relation thereto.

Bearings 58 are provided on the face of the ram, see Fig. 7, and worm 59 is journaled therein said worm meshing with the worm wheel 57 provided on the nut 53.

A crank 60 forms a part of the worm assembly, and as wear takes place, this crank is actuated to drive the worm and worm wheel, 57 and 59, which in turn rotates the nut 53 on the threaded rod 51 and adjusts the ram and upper roll accordingly, thus providing a quick, self-locking and accurate means of adjustment which is readily accessible to the operator.

The welding wheels are gear driven by the roll step method which allows the wheels to remain stationary when welding and to move only between welds. This method utilizes an air cylinder 61 connected to a suitable source of air supply, and a piston 62 is slidably and reciprocatingly mounted in the cylinder 61, a rod 63 being secured thereto and to a rack 64 which is secured to the opposite end of said rod, said rack meshing with and driving a gear 65 provided on the horizontally disposed worm drive shaft 66 which extends into the speed reducer D.

Spaced apart pawls 67 are mounted on pins 68 provided on the gear 65 said pawls engaging a ratchet wheel 69 which is mounted on the worm shaft extension 66. A laterally projecting brake drum 70 is provided on the ratchet hub and a brake section 71 is disposed in facial contact therewith, springs 72 being interposed between the brake section and the pawls 67, to insure engagement with the ratchet. The brake is used to prevent reverse rotation of the mechanism, and a limit switch 73 is located below the rack for engagement as usual.

An adjustment nut 74 is provided on the upper end of the cylinder 61 as shown and is actuated to control the stroke which determines the amount of welding roll surface travel.

In practice, the operator adjusts the member 74 to secure the necessary stroke, which drives the shaft 66 and the shafts 22 and 39 in turn through the speed reducer, so that the welding wheels rotate step by step to suit the work and secure the number of welds desired, the welding current being controlled by limit switches, etc., as usual.

As the welding wheels are dressed, the universal joints 48 compensate for misalignment and when it is necessary to remove the wheels for dressing, the operator merely swings the outboard bearings clear, removes the wheel clamping nuts 19 and 42 and the wheels are then free for removal.

When the wheels have been dressed and replaced, the operator actuates the crank 60 to lower or raise the ram to provide proper clearance between the faces of the welding wheels, and the machine is again ready for operation. The changing and adjusting is both simple and easy and can be quickly accomplished.

From the foregoing description it will be obvious that I have perfected a quick change, wheel mounting assembly and outboard support, composed of few parts, all of which are of substantial construction, which materially simplifies and speeds up the welding wheel changing, and insures perfect alignment and operation.

What I claim is:

1. In a welding apparatus of the class described, a frame, a shaft, a welding wheel removably mounted on said shaft, an outboard support hingedly mounted on said frame and supporting the outer end of said shaft, means for driving said shaft, and latch means for locking the outboard support in raised position.

2. In a welding machine of the class described, a frame, a shaft journaled thereon, a welding wheel removably mounted on said shaft, an outboard support swingingly mounted on the frame and engaging the outer end of the shaft, quickly removable means for rigidly securing the wheel on said shaft, means for driving the shaft, and latching means for securing the outboard support in engaged position.

3. In a welding machine of the class described, a main frame, a shaft journaled on the frame and provided with a shouldered threaded outer end section, a welding wheel mounted on the shaft, a collar on the shaft adjacent the wheel, an out board support hingedly mounted on the frame and formed with a bearing section in which said collar is journaled, means on the threaded end section of the shaft for clamping the parts in assembled relation, and latching means for securing the support in engaged position.

4. A welding apparatus of the class described comprising a frame, a lower welding wheel assembly, a ram, an upper welding wheel assembly carried thereby and cooperating with the lower welding wheel assembly, hingedly mounted outboard bearing supports forming a part of each assembly and adapted to be swung outwardly and out of engagement with the welding wheel shafts to permit removal of the welding wheels, and locking members for holding said bearing supports in engaging position.

5. A welding apparatus of the character described comprising a frame, a ram, an upper welding wheel assembly carried thereby and reciprocable therewith, a lower welding wheel assembly, mounted on the frame in vertical alignment with the upper assembly, outboard bearing supports hingedly connected to said assemblies and adapted to be swung outwardly and out of engagement therewith to permit free removal of the welding wheels, and releasable means for securing said supports in upright position.

6. A welding apparatus of the class described comprising a frame, a ram, an upper welding wheel assembly mounted on said ram and reciprocable therewith, said assembly including a driven shaft on which the welding wheel is mounted, a lower welding wheel assembly cooperating therewith, and including a shaft and welding wheel, an outboard bearing support pivotally connected to and forming a part of each assembly and engageable with each shaft at a point adjacent the welding wheel, and means for intermittently driving said shafts and welding wheels.

7. In a welding machine of the class described, a frame, a shaft, a welding wheel removably mounted on said shaft, an outboard bearing support hingedly connected to the frame and engaging the outer end of the shaft, a manually operable latch for releasing the bearing support to permit it to be swung outwardly for easy removal of the welding wheel, and means for intermittently driving said shaft and welding wheel.

8. A welding apparatus comprising a frame, vertically spaced welding wheel assemblies mounted on the frame and including outboard bearing supports pivotally mounted on said frame and engageable with each assembly, said supports being adapted to be swung outwardly and clear of said assembly to permit free and unobstructed removal of the welding wheels, and latch members for securing said bearings in upright operative position.

CLYDE F. KAUNITZ.